US008003223B2

(12) United States Patent
Maruyama et al.

(10) Patent No.: US 8,003,223 B2
(45) Date of Patent: Aug. 23, 2011

(54) HEAT-SEALABLE PROPYLENE-BASED POLYMER COMPOSITION, HEAT-SEALABLE FILM, AND USES THEREOF

(75) Inventors: Kazuhide Maruyama, Koga (JP); Ichiro Takeishi, Koga (JP); Norihide Inoue, Nagoya (JP); Hiroshi Hoya, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 319 days.

(21) Appl. No.: 12/083,764

(22) PCT Filed: Oct. 13, 2006

(86) PCT No.: PCT/JP2006/320503
§ 371 (c)(1),
(2), (4) Date: Apr. 18, 2008

(87) PCT Pub. No.: WO2007/046307
PCT Pub. Date: Apr. 26, 2007

(65) Prior Publication Data
US 2009/0258243 A1  Oct. 15, 2009

(30) Foreign Application Priority Data
Oct. 21, 2005  (JP) ................................. 2005-307375

(51) Int. Cl.
*B32B 27/32* (2006.01)
*C08L 23/16* (2006.01)
(52) U.S. Cl. ........ 428/516; 428/523; 428/515; 524/451; 524/515; 525/95; 525/323
(58) Field of Classification Search .................... 525/95, 525/323
See application file for complete search history.

(56) References Cited

U.S. PATENT DOCUMENTS

| | | | |
|---|---|---|---|
| 6,191,219 B1 * | 2/2001 | Tanaka et al. ................... | 525/95 |
| 2003/0176555 A1 * | 9/2003 | Watanabe et al. ............. | 524/451 |
| 2004/0010087 A1 * | 1/2004 | Obata et al. ................... | 525/240 |
| 2004/0030052 A1 * | 2/2004 | Kanzaki ........................ | 525/323 |
| 2005/0249963 A1 * | 11/2005 | Obata et al. ................... | 428/523 |

FOREIGN PATENT DOCUMENTS

| EP | 1 471 099 A1 | 10/2004 |
|---|---|---|
| EP | 1 614 699 A1 | 1/2006 |
| JP | 08-283491 A | 10/1996 |
| JP | 11-291279 A | 10/1999 |
| JP | 11-293062 A | 10/1999 |
| JP | 2000-129053 A | 5/2000 |
| JP | 2000-230088 A | 8/2000 |
| JP | 2000-255012 | 9/2000 |
| JP | 2001-172402 A | 6/2001 |
| JP | 2003-096251 A | 4/2003 |

OTHER PUBLICATIONS

European Search Report dated Nov. 20, 2009 in corresponding European Application No. 06811776.1.
International Search Report dated Dec. 19, 2006 for International Application No. PCT/JP2006/320503.

* cited by examiner

*Primary Examiner* — Hoa Le
*Assistant Examiner* — Ronak Patel
(74) *Attorney, Agent, or Firm* — Foley & Lardner LLP

(57) ABSTRACT

The present invention is directed to a heat-sealable propylene-based polymer composition comprising a propylene polymer composition including a propylene polymer component and propylene/ethylene random copolymer component; an ethylene/α-olefin random copolymer; and a soft propylene polymer composition. The present invention also provides a heat-sealable film using the composition and a packaging bag comprising the film. The heat-sealable film of the present invention has high heat-seal strength, with little decrease in heat-seal strength even after heat treatment. The heat-sealable film also has excellent blocking resistance, rigidity and low-temperature impact resistance.

11 Claims, No Drawings

HEAT-SEALABLE PROPYLENE-BASED POLYMER COMPOSITION, HEAT-SEALABLE FILM, AND USES THEREOF

TECHNICAL FIELD

The present invention relates to a heat-sealable propylene-based polymer composition which has rigidity and low-temperature impact resistance and is extremely little decreased in heat-seal strength even after it is subjected to heat treatment such as retort sterilization treatment, a heat-sealable film comprising the composition and a package wherein an article to be packaged that requires heating/sterilization treatment is packaged with the film.

BACKGROUND ART

From the viewpoints of diversification of food culture, shortening of cooking time and demand for convenience, it has become frequent that so-called retort pouch food obtained by introducing previously cooked food into a pouch, sealing the pouch and subjecting it to pressing/heating sterilization is purchased, the retort pouch food with the pouch is heated in hot water when necessary and the contents are taken out of the pouch and taken as a meal. Such retort pouch foods have begun to spread not only for usual home use but also for business use, and therefore, packaging materials capable of packaging a large quantity of foods at once have been desired.

Such retort pouch foods are subjected to room-temperature preservation over a long period of time or occasionally subjected to refrigeration/freezing preservation, and therefore, films that become their packaging materials are required to have high heat-seal strength and low-temperature impact resistance so that they should not be broken from the heat seal parts. Moreover, after packaging the retort pouch foods and sealing the packaging materials, the retort pouch foods are subjected to retort sterilization treatment in a high-temperature high-pressure pot at a temperature of about 100 to 140° C., and therefore, also from the viewpoint of quality control of foods, heat resistance of such a level as is capable of enduring the treatment at the heat seal parts and retention of heat-seal strength are required for the packaging materials.

In order to prevent decrease in heat-seal strength after heating/sterilization treatment such as retort treatment even if the degree of prevention is slight, there have been made a large number of proposals, such as a method of using a propylene/α-olefin block copolymer constituted of 95 to 70% by mass of polypropylene block units and 5 to 30% by mass of elastomer block units for a heat-sealing layer (e.g., patent document 1) and a propylene-based polymer composition obtained by adding a specific ethylene/α-olefin random copolymer component (C) to a propylene polymer component (A) and a propylene/α-olefin random copolymer component (B) (e.g., patent document 2).

Even if the above propylene-based polymer composition or the like is used, however, decrease in heat-seal strength after heating/sterilization cannot be inhibited in some cases.

Patent document 1: Japanese Patent Laid-Open Publication No. 2000-255012
Patent document 2: Japanese Patent Laid-Open Publication No. 2003-96251

DISCLOSURE OF THE INVENTION

Problem to be Solved by the Invention

The present inventors have made various studies with an object of developing heat-sealable films capable of sufficiently preventing decrease in heat-seal strength after heating/sterilization treatment such as retort treatment, and as a result, they have found that the object can be attained by adding a propylene block polymer to a propylene polymer composition comprising a propylene polymer component, a propylene/α-olefin random copolymer component and an ethylene/α-olefin random copolymer. Based on the finding, the present invention has been accomplished.

Means to Solve the Problem

The heat-sealable propylene-based polymer composition of the present invention is characterized in that a composition comprising:
a propylene polymer composition (A) comprising a propylene polymer component (a1) and a propylene/ethylene random copolymer component (a2) having a propylene unit content of 63 to 77% by mol and an ethylene unit content of 23 to 37% by mol,
an ethylene/α-olefin random copolymer (B), and
a soft propylene polymer (C) which has an ethylene content of 0 to 30% by mol and an α-olefin content of 0 to 30% by mol and whose melting point, as measured by a differential scanning calorimeter (DSC), is not higher than 100° C. or is not observed, and
containing the propylene polymer composition (A) in an amount of 50 to 90% by mass, the ethylene/α-olefin random copolymer (B) in an amount of 3 to 25% by mass and the soft propylene polymer (C) in an amount of 0.5 to 40% by mass ((A)+(B)+(C)=100% by mass).

Further, the heat-sealable propylene-based polymer composition of the present invention is characterized in that a composition comprising:
a propylene polymer composition (A) comprising a propylene polymer component (a1) and a propylene/ethylene random copolymer component (a2) having a propylene unit content of 63 to 77% by mol and an ethylene unit content of 23 to 37% by mol,
an ethylene/α-olefin random copolymer (B), and
a soft propylene polymer composition (D) comprising a propylene polymer (d1) and a propylene/ethylene/α-olefin random copolymer (d2) which has an ethylene content of 2 to 30% by mol and an α-olefin content of 2 to 30% by mol and whose melting point, as measured by a differential scanning calorimeter (DSC), is not observed,
wherein:
(1) a mass ratio of the propylene polymer component (a1) to the propylene/ethylene random copolymer component (a2) in the propylene polymer composition (A) is in the range of 60:40 to 97:3, and the propylene/ethylene random copolymer component (a2) has an intrinsic viscosity [η] of 1 to 7 dl/g,
(2) the ethylene/α-olefin random copolymer (B) has a density of 0.865 to 0.910 g/cm$^3$,
(3) a mass ratio of the propylene polymer (d1) to the propylene/ethylene/α-olefin random polymer (d2) in the soft propylene polymer composition (D) is in the range of 5:95 to 70:30, and
containing the propylene polymer composition (A) in an amount of 50 to 90% by mass, the ethylene/α-olefin random copolymer (B) in an amount of 3 to 25% by mass and the soft propylene polymer composition (D) in an amount of 0.5 to 40% by mass ((A)+(B)+(D)=100% by mass).

The present invention is also a heat-sealable film obtained from the above-mentioned heat-sealable propylene-based polymer composition, and is also a use of the film.

Effect of the Invention

A package obtained by the use of a heat-sealable film that is obtained from the heat-sealable propylene-based polymer composition of the present invention has high heat-seal strength, and besides, it is almost free from decrease in heat-seal strength even after heat treatment, is excellent also in blocking resistance, transparency and resistance to whitening on bending and has high rigidity and low-temperature impact resistance.

BEST MODE FOR CARRYING OUT THE INVENTION

Propylene Polymer Component (a1)

The propylene polymer component (a1) contained in the propylene polymer composition (A) according to the present invention is a propylene homopolymer or a copolymer of propylene and an α-olefin of not more than 10% by mass, preferably not more than 5% by mass. The α-olefin is usually an α-olefin of 2 to 10 carbon atoms other than propylene, and examples thereof include ethylene, 1-butene, 3-methyl-1-butene, 1-pentene, 3-methyl-1-pentene, 4-methyl-1-pentene, 1-hexene and 1-octene. Taking into consideration heat resistance given when the resulting composition is molded into a film, a propylene homopolymer is preferable as the propylene polymer component (a1).

Propylene/Ethylene Random Copolymer Component (a2)

The propylene/ethylene random copolymer component (a2) contained in the propylene polymer composition (A) according to the present invention is a copolymer of propylene and ethylene and has elastomeric properties.

In the propylene/ethylene random copolymer component (a2), the content of propylene units is in the range of 63 to 77% by mol, preferably 70 to 77% by mol, and the content of ethylene units is in the range of 23 to 37% by mol, preferably 23 to 30% by mol. When the content of propylene units is in the above range, a film which is excellent in low-temperature impact resistance and low-temperature heat-sealing property and retains high seal strength even after heat treatment can be formed from a composition containing this copolymer component. The content of propylene units in the propylene/ethylene random copolymer component (a2) can be determined by $^{13}C$-NMR. In the present invention, small amounts of α-olefin component units of about 4 to 10 carbon atoms may be contained in the propylene/ethylene copolymer component (a2) within limits not detrimental to the object of the present invention.

The intrinsic viscosity [η] of the propylene/ethylene random copolymer component (a2) is in the range of usually 1 to 7 dl/g, preferably 1.8 to 4.5 dl/g, more preferably 2.0 to 3.3 dl/g. When the intrinsic viscosity [η] is in the above range, a heat-sealable film having excellent blocking resistance can be formed from a heat-sealable propylene-based polymer composition containing the component, with inhibiting occurrence of fish eye.

Propylene Polymer Composition (A)

The propylene polymer composition (A) according to the present invention is a composition containing the propylene polymer component (a1) and the propylene/ethylene random copolymer component (a2) in a mass ratio of 60:40 to 97:3, preferably 65:35 to 95:5, more preferably 70:30 to 89:11. When the amount of the propylene/ethylene random copolymer component (a2) is in the above range, a film excellent in low-temperature impact resistance, rigidity, initial heat-seal strength and heat-seal strength after heat treatment, particularly a heat-sealable film suitable for packaging an article to be packaged that requires heating/sterilization treatment, such as retort pouch food, can be obtained.

The propylene polymer composition (A) has a melt flow rate (MFR, at 230° C. under load of 2.16 kg in accordance with ASTM D-1238) of preferably 2 to 10 g/10 min, more preferably 2.5 to 8 g/10 min. A composition having such a melt flow rate value has excellent film moldability and is suitable for producing a film having excellent low-temperature impact resistance.

The propylene polymer composition (A) according to the present invention can be obtained by mixing the propylene polymer component (a1) and the propylene/ethylene random copolymer component (a2), which have been obtained separately from each other, or can be obtained by the later-described polymerization process. When the propylene polymer composition (A) is prepared by the later-described polymerization process, the amount (proportion) of the propylene/ethylene random copolymer component (a2) in the propylene polymer composition (A) is a value determined by the following method. That is to say, a sample (a: gram) of the propylene polymer composition (A) is completely dissolved in p-xylene, thereafter the resulting solution is allowed to stand for 24 hours at 23° C., then a precipitate (b: gram) is separated by centrifugal separation, and a p-xylene soluble portion in the propylene polymer composition (A) is calculated from the following formula as the amount of the component (a2).

Proportion of propylene/ethylene random copolymer component=$[(a-b)/a]\times 100$ (% by mass)

The intrinsic viscosity [η] of the propylene/ethylene random copolymer component (a2) is a value determined by adding an excess acetone to the above p-xylene soluble portion to precipitate a copolymer component and measuring an intrinsic viscosity of the recovered precipitate in a decalin solvent at 135° C.

The propylene polymer composition (A) comprising the propylene polymer component (a1) and the propylene/ethylene random copolymer component (a2) can be obtained by preparing the propylene polymer component (a1) and the propylene/ethylene random copolymer component (a2) by polymerization processes different from each other and then mixing them. The polymerization process for the propylene polymer component (a1) and the polymerization process for the propylene/ethylene random copolymer component (a2) may be carried out in series or in parallel. In the former case, any of these processes may be carried out first, but it is preferable to carry out the polymerization process for the propylene polymer component (a1) first because a highly crystalline polymer can be prepared as the propylene polymer component (a1). Although the first polymerization process can be carried out as a batch polymerization process or a continuous polymerization process, the continuous polymerization process is preferable. The continuous polymerization process can be carried out in a single step using one polymerization reactor or can be carried out as a multi-step process using plural polymerization reactors in multiple steps.

The propylene polymer composition (A) comprising the propylene polymer component (a1) and the propylene/ethylene random copolymer component (a2) obtained by such polymerization processes is usually called block PP in many cases, but this propylene polymer composition (A) is actually a composition comprising a mixture of the propylene polymer component (a1) and the propylene/ethylene random copolymer component (a2).

Ethylene/α-Olefin Random Copolymer (B)

The ethylene/α-olefin random copolymer (B) according to the present invention is a random copolymer of ethylene and an α-olefin of 3 or more carbon atoms, preferably 4 to 10 carbon atoms. Examples of the α-olefins include 1-butene, 3-methyl-1-pentene, 4-methyl-1-pentene, 1-hexene, 1-octene, 1-decene, 1-tetradecene and 1-octadecene. Of these, 1-butene, 1-hexene and 1-octene are particularly preferable. These α-olefins may be contained singly or in combination of two or more kinds. The ethylene/α-olefin random copolymer (B) may be a mixture of different ethylene/α-olefin random copolymers.

Examples of preferred ethylene/α-olefin random copolymers (B) include an ethylene/1-butene random copolymer, an ethylene/1-hexene random copolymer and an ethylene/1-octene random copolymer.

The density of the ethylene/α-olefin random copolymer (B) is in the range of 0.865 to 0.910 g/cm$^3$, preferably 0.875 to 0.900 g/cm$^3$.

In the ethylene/α-olefin random copolymer (B), the content of ethylene units is in the range of preferably 70 to 95% by mol, more preferably 80 to 93% by mol, and the content of α-olefin units is in the range of preferably 5 to 30% by mol, more preferably 7 to 20% by mol.

The ethylene/α-olefin random copolymer (B) desirably has any of the following properties (I) to (IV), and from a propylene polymer composition containing the ethylene/α-olefin random copolymer (B) having such properties, a film which is more excellent in low-temperature impact resistance and drop impact strength can be obtained. As a matter of course, the ethylene/α-olefin random copolymer (B) may have plural properties of the properties (I) to (IV) in combination.

(I) A melt flow rate, as measured at 190° C. under a load of 2.16 kg in accordance with ASTM D-1238, is in the range of preferably 0.01 to 20 (g/10 min), more preferably 0.1 to 10 (g/10 min).

(II) A crystallinity, as measured by X-ray diffractometry, is in the range of preferably 0 to 40%, more preferably 7 to 30%.

(III) A ratio (Mw/Mn) of the weight-average molecular weight (Mw) to the number-average molecular weight (Mn), as measured by gel permeation chromatography (GPC), is in the range of preferably not more than 3, more preferably not more than 2.5.

(IV) A melting point (Tm), as determined from an endothermic curve measured under the conditions of a heating rate of 10° C./min using a differential scanning calorimeter (DSC), is not observed or is in the range of preferably 30 to 110° C., more preferably 50 to 90° C.

When a film is formed from a heat-sealable propylene-based polymer composition containing the ethylene/α-olefin random copolymer (B) having property values of the above ranges, a film which is more excellent in low-temperature impact resistance and drop impact strength can be obtained.

Soft Propylene Polymer (C)

In the soft propylene polymer (C) according to the present invention, the content of ethylene units is in the range of 0 to 30% by mol, the content of α-olefin units of 4 to 20 carbon atoms is in the range of 0 to 30% by mol, and the melting point as measured by a differential scanning calorimeter (DSC) is not higher than 100° C. or is not observed. The expression "melting point is not observed" referred to herein means that a crystal melting peak at which the quantity of heat of crystal fusion is not less than 1 J/g is not observed in the range of −150 to 200° C.

The soft propylene polymer (C) can be obtained by homopolymerizing propylene or copolymerizing propylene and ethylene and/or an α-olefin in the presence of a solid catalyst containing a titanium compound as a main component or a metallocene catalyst, and as to its stereoregularity, any of isotactic, syndiotactic and atactic structures is adoptable.

Examples of the soft propylene polymers (C) employable in the present invention include:

a homopolymer of propylene, a propylene/ethylene copolymer constituted of 70 to 99% by mol of propylene units and 1 to 30% by mol of ethylene units, preferably 80 to 99% by mol of propylene units and 1 to 20% by mol of ethylene units (total of propylene units and ethylene units: 100% by mol), a propylene/α-olefin copolymer constituted of 70 to 99% by mol of propylene units and 1 to 30% by mol of α-olefin units of 4 to 20 carbon atoms (total of propylene units and α-olefin units: 100% by mol), and a propylene/ethylene/α-olefin copolymer constituted of 40 to 98% by mol of propylene units, 1 to 30% by mol of ethylene units and 1 to 30% by mol of α-olefin units of 4 to 20 carbon atoms (total of propylene units, ethylene units and α-olefin units: 100% by mol).

Of the above propylene/α-olefin copolymers, a propylene/1-butene copolymer constituted of 70 to 99% by mol of propylene units and 1 to 30% by mol of 1-butene units (total of propylene units and 1-butene units: 100% by mol) is a preferred example in the present invention.

As the most preferred form of the soft propylene polymer (C), there can be mentioned the following propylene/ethylene/α-olefin random copolymer (d2). In this propylene/ethylene/α-olefin random copolymer (d2), the ethylene content is in the range of 2 to 30% by mol, preferably 2 to 23% by mol, and the α-olefin content is in the range of 2 to 30% by mol, preferably 2 to 28% by mol. The α-olefin referred to herein is an α-olefin of 4 to 20 carbon atoms, preferably 4 to 10 carbon atoms, and 1-butene, 1-pentene, 1-hexene and 1-octene are more preferable. Of these, 1-butene is the most preferable.

The propylene/ethylene/α-olefin random copolymer (d2) has properties that even if a melting point is measured by a differential scanning calorimeter (DSC), its melting point is not observed.

Such a propylene/ethylene/α-olefin random copolymer (d2) can be obtained by copolymerizing propylene, ethylene and an α-olefin preferably in the presence of a solid catalyst containing a titanium compound as a main component or a single site catalyst, preferably a metallocene catalyst, and as to its stereoregularity, any of isotactic and syndiotactic structures is adoptable. Especially in the present invention, it is preferable to use a propylene/ethylene/α-olefin random copolymer of isotactic structure prepared by the use of a metallocene catalyst, which is described in for example Japanese Patent Laid-Open Publication No. 1999-293062.

Triad tacticity (mm fraction) of the propylene/ethylene/α-olefin copolymer (d2) can be determined by measuring a $^{13}$C-NMR spectrum. Although the mm fraction of the propylene/ethylene/α-olefin copolymer (d2) for use in the present invention is not specifically restricted, it is desirable to use a propylene/ethylene/α-olefin copolymer (d2) having a mm fraction of preferably not less than 85%, more preferably 85 to 97.5%, still more preferably 87 to 97%, particularly preferably 90 to 97%. When the mm fraction value is in the above range, a film having particularly high heat-seal strength and retaining high seal strength even after heat treatment can be formed.

When the ethylene content, the α-olefin content and the melting point of the propylene/ethylene/α-olefin random copolymer (d2) are in the above ranges, an excellent film which is little decreased in heat-seal strength after heat treatment is obtained in the formation of the later-described film of the present invention.

The melt flow rate value of the propylene/ethylene/α-olefin random copolymer (d2), as measured at 230° C. under a load of 2.16 kg in accordance with ASTM D-1238, is usually in the range of 0.01 g/10 min to 30 g/10 min, preferably 0.1 g/10 min to 20 g/10 min.

Heat-Sealable Propylene-Based Polymer Composition

The heat-sealable propylene-based polymer composition of the present invention is a composition comprising the aforesaid propylene polymer composition (A) in an amount of 50 to 90% by mass, preferably 55 to 90% by mass, the ethylene/α-olefin random copolymer (B) in an amount of 3 to 25% by mass, preferably 8 to 20% by mass, and the soft propylene polymer (C) in an amount of 0.5 to 40% by mass, preferably 1 to 25% by mass, more preferably 2 to 25% by mass, particularly preferably 3 to 25% by mass ((A)+(B)+(C)=100% by mass).

If a composition comprising the ethylene/α-olefin random copolymer (B) in an amount of less than 3% by mass is used, the resulting heat-sealable film is liable to have poor impact resistance. If a composition comprising the ethylene/α-olefin random copolymer (B) in an amount exceeding 25% by mass is used, the resulting heat-sealable film tends to suffer blocking and is liable to be decreased in heat-seal strength after heat treatment.

If a composition comprising the soft propylene polymer (C) in an amount of less than 0.5% by mass is used, decrease in heat-seal strength of the resulting heat-sealable film after heat treatment is not improved. If a composition comprising the soft propylene polymer (C) in an amount exceeding 40% by mass is used, the resulting heat-sealable film tends to suffer blocking.

The melt flow rate (MFR: at 230° C. under load of 2.16 kg in accordance with ASTM D-1238) of the heat-sealable propylene-based polymer composition of the present invention is in the range of preferably 2 to 10 g/10 min, more preferably 2.5 to 8 g/10 min. By the use of a composition having such a melt flow rate value, film moldability becomes excellent, and a film having excellent low-temperature impact resistance can be formed.

A preferred form of the heat-sealable propylene-based polymer composition of the present invention is a composition comprising the propylene polymer composition (A) in an amount of 50 to 90% by mass, preferably 55 to 90% by mass, the ethylene/α-olefin random copolymer (B) in an amount of 3 to 25% by mass, preferably 8 to 20% by mass, and a soft propylene polymer composition (D) in an amount of 0.5 to 40% by mass, preferably 1 to 25% by mass ((A)+(B)+(D)=100% by mass).

The soft propylene polymer composition (D) is a composition comprising a propylene polymer (d1) and the aforesaid propylene/ethylene/α-olefin random copolymer (d2), and the mass ratio ((d1):(d2)) of the propylene polymer (d1) to the propylene/ethylene/α-olefin random copolymer (d2) is in the range of 5:95 to 70:30, preferably 5:95 to 40:60.

The propylene polymer (d1) is homopolypropylene or a propylene/α-olefin copolymer having a melting point of 110 to 165° C., and is preferably a propylene/α-olefin copolymer having a melting point of 115 to 150° C. Examples of the α-olefins include α-olefins of 2 to 20 carbon atoms except propylene, specifically ethylene and 1-butene.

The melt flow rate value of the propylene polymer (d1), as measured at 230° C. under a load of 2.16 kg in accordance with ASTM D-1238, is in the range of 0.01 to 50 (g/10 min), preferably 0.1 to 30 (g/10 min).

By using the soft propylene polymer composition (D) as one component of the heat-sealable propylene-based polymer composition, a film which is little decreased in heat-seal strength after heat treatment and is excellent in impact resistance and resistance to whitening on bending is obtained.

Although the heat-sealable propylene-based polymer composition of the present invention is obtained by mixing or melt kneading given amounts of the aforesaid propylene polymer composition (A), the ethylene/α-olefin random copolymer (B) and the soft propylene polymer (C) or the soft propylene polymer composition (D), it is also possible to obtain the heat-sealable propylene-based polymer composition by directly polymerizing each component through a multi-step polymerization process or the like.

To the heat-sealable propylene-based polymer composition of the present invention, antioxidant, heat stabilizer, lubricant, antistatic agent, hydrochloric acid absorbent, antiblocking agent, slipping agent, nucleating agent, pigment, dye, various polymers, etc. may be added within limits not detrimental to the object of the present invention.

Examples of the antioxidants include phenol-based antioxidants, organic phosphite-based antioxidants, thioether-based antioxidants and hindered amine-based antioxidants. Examples of the anti-blocking agents include aluminum oxide, finely powdered silica, polymethyl methacrylate powder and silicone resin.

Examples of the slipping agents include bisamides, such as ethylene bisstearamide, and higher fatty acid amides, such as oleic amide and erucic amide. Examples of the lubricants include higher fatty acid metal salts, such as calcium stearate, zinc stearate and montanic acid metal salt, and polyolefin waxes, such as polyethylene wax and polypropylene wax. Examples of the nucleating agents include dibenzylidene sorbitol, rosin-based nucleating agents, such as partial metal salt of rosin acid, aluminum-based nucleating agents, and talc.

Heat-Sealable Film

The heat-sealable film of the present invention can be obtained by using the heat-sealable propylene-based polymer composition and subjecting the composition to film molding by a usual method. For example, the heat-sealable film can be produced by melting pellets or a powder of the heat-sealable propylene-based polymer composition using a single-screw or twin-screw extruder and extruding the molten resin into a film from a T-die or a circular die installed at the tip of the extruder. The molten resin temperature in the extruder is preferably in the range of 200 to 300° C.

In the case where the molten resin is extruded from a T-die, the film extruded is brought into contact with a roll having been preset at a given temperature by water or another medium, and thereby cooled/solidified, and then the film is wound up. In the case where the molten resin is extruded from a circular die, the exterior and/or the interior of the circular film is cooled with a cooling medium such as cooled air or water, and then the film is wound up after slitting or as it is, whereby the desired film is produced. The film thus obtained has a thickness of usually 10 to 1000 μm, preferably 30 to 200 μm, more preferably 40 to 100 μm.

The heat-sealable film of the present invention can be used as a general packaging film while it is in the form of a single layer, and the film is particularly suitable as a packaging film for articles to be packaged that require heating/sterilization treatment, such as retort pouch foods. Further, the heat-sealable film can be laminated onto a layer capable of becoming a base, and can be used in the form of a laminate for the same use.

Heat-Sealable Laminated Film

The heat-sealable laminated film of the present invention is a laminate obtained by laminating a base layer on one surface of the above-described heat-sealable film. The base layer is not specifically restricted provided that it is employable as a packaging material, and the base layer may take any of various forms, such as sheet, film, tray and container.

Examples of the base layers employable include a thermoplastic resin film or sheet, a tray or a cup-shaped container obtained by thermoforming the sheet, and similar shaped articles formed from aluminum foil or paper.

Examples of the thermoplastic resin films include films of polyester resins such as polyethylene terephthalate and polyethylene naphthalate, polycarbonate film, films of polyamides such as nylon 6 and nylon 66, ethylene/vinyl alcohol copolymer film, polyvinyl alcohol film, polyvinyl chloride film, polyvinylidene chloride film, and films of polyolefins such as polypropylene. As the polypropylene, there can be used a resin manufactured and sold as a polypropylene resin, such as the aforesaid propylene polymer composition (A), a propylene polymer component and a propylene/α-olefin random copolymer, which is similar to the propylene polymer composition (A), or a propylene homopolymer. The base layer may have a single-layer structure or a multi-layer structure of two or more layers.

When the base layer is in the form of a film, the film may be an unstretched film or a monoaxially or biaxially stretched film. In the case of the thermoplastic resin film, a film obtained by depositing a metal such as aluminum or zinc, an oxide such as silica, zinc oxide or aluminum oxide, or an inorganic compound on the thermoplastic resin film is also available. Further, the base layer may be a composite or a laminate using a combination thereof. In particular, a biaxially stretched terephthalate film, biaxially stretched polyamide, biaxially stretched polypropylene and the like are preferable because they have excellent heat resistance.

For producing a laminated film by forming the heat-sealable film layer of the present invention on the surface of the base layer, a laminating method generally used can be adopted as it is, and in this method, an adhesive layer may be disposed between those layers. For example, the base layer is coated with a urethane-based or isocyanate-based anchor coating agent, and thereon the heat-sealable film is dry-laminated, or the heat-sealable propylene-based polymer composition is directly extruded on the base layer to perform laminating or extrusion coating, whereby the laminated film can be produced. In the case where the base layer is formed from a thermoplastic resin, the heat-sealable propylene-based polymer composition and the thermoplastic resin such as the aforesaid polypropylene are co-extruded, whereby a heat-sealable laminated film comprising a heat-sealable layer obtained from the heat-sealable propylene-based polymer composition and the base layer composed of the thermoplastic resin can be produced.

In the heat-sealable laminated film of the present invention, the heat-sealable layer obtained from the heat-sealable propylene-based polymer composition can be made to have a small thickness of 2 to 20 μm.

Package

The package of the present invention is a package which uses the heat-sealable film or the heat-sealable laminated film as at least one packaging material and in which articles to be packaged that require heating/sterilization treatment, such as retort pouch foods, medicines, medical appliances and pet foods as the contents, are packaged by disposing the heat-sealable film layer so as to be located on the inner surface side, filling or packing the articles and heat-sealing the heat-sealable film layer.

As the packaging material, the heat-sealable film single layer may be used, but the heat-sealable laminated film is preferable because various properties possessed by the base layer can be utilized. In the case where the heat-sealable laminated film is used for producing a package of retort pouch food or the like, the following combinations of the base layer and the heat-sealable film layer can be mentioned as examples of the heat-sealable laminated films, without limiting thereto.

Polyester layer/heat-sealable film
Polyester layer/polypropylene layer/heat-sealable film
Polyamide layer/heat-sealable film
Polyamide layer/polypropylene layer/heat-sealable film
Polyester layer/aluminum foil/heat-sealable film
Polyester layer/polyamide layer/aluminum foil/heat-sealable film
Polyamide layer/polyvinylidene chloride layer/polyester layer/heat-sealable film As for the package of the present invention, the heat-sealable film layer is disposed so as to be located as the innermost layer and then heat-sealed. Therefore, the heat-seal strength at the heat seal parts is high, and even after heat treatment, high heat-seal strength is retained.

Accordingly, in the package of an article to be packaged that requires heating/sterilization treatment, there is little fear of leak of the article that requires heating/sterilization treatment, such as retort pouch food that is the content, even when the package is transported or handled in the shops and homes, and moreover, even when the package is stored for a long period of time at room-temperature or under refrigeration or freezing, the content is hardly changed in quality. In the present invention, examples of the articles to be packaged include not only general foods but also general articles to be packaged that require heating/sterilization treatment, such as retort pouch foods, medicines, medical appliances and pet foods.

EXAMPLES

The present invention is further described with reference to the following examples, but it should be construed that the present invention is in no way limited to those examples so long as they do not exceed the technical idea of the invention. In the following examples, "%" and "part(s)" mean "% by mass" and "part(s) by mass", respectively, except those relating to solvents, unless otherwise noted.

Evaluation of Property Values

Property values, etc. in the examples and the comparative examples are values determined by the following evaluation methods.

(1) Tensile Modulus (MPa)

From the heat-sealable film, a test strip having a width of 15 mm and a length of 150 mm was cut out in the machine direction (MD) and in the transverse direction (TD), respectively and the tensile modulus was measured using a Tensilon universal tester RTC-1225 (manufactured by Orientec Corporation) under the conditions of a chuck distance of 50 mm and a tensile rate of 5 mm/min in accordance with JIS K7127. The measured value is the mean value of 5 times.

(2) Haze (%)

Haze of one heat-sealable film was measured in accordance with JIS K 7105 using a haze meter (NDH-300A manufactured by Nippon Denshoku Industries Co., Ltd.).

(3) Low-Temperature Impact Strength (KJ/m)

From the heat-sealable film, a test specimen of 100×100 mm was cut out, and the low-temperature impact strength was measured using a film impact tester equipped with a constant temperature bath (manufactured by Toyo Seiki Kogyo Co., Ltd.) under the conditions of a measuring temperature of −20° C., a hammer tip diameter of ½ inch and a hammer energy of 3 J. The measured value is the mean value of 10 times.

Further, tear in the heat-sealable film after the measurement was observed. The evaluation criteria are as follows.

AA: The heat-sealable film is torn to give a round hole.

BB: The heat-sealable film is torn to give cracks.

(4) Blocking Strength (N/5.2 cm$^2$)

From the heat-sealable film, test specimens of 20×150 mm were cut out, then two of the test specimens were superposed upon each other in such a manner that the surfaces having been subjected to no corona treatment faced each other, and they were allowed to stand for 7 days at 60° C. under a load of 4 kg based on an area of 5.2 cm$^2$. Thereafter, the degree of blocking was measured. The measured value was the mean value of 5 times.

(5) Heat-Seal Strength (N/15 mm)

Heat-sealable laminated films were prepared in advance. That is to say, a biaxially stretched polyethylene terephthalate film (trade name: Emblet PET12, available from Unitika Ltd.) having a thickness of 12 μm was used as a base layer, and a corona treatment surface of the base layer and an aluminum foil having a thickness of 7 μm were dry-laminated using a urethane-based adhesive (Takelac A616 (trade name, available from Takeda Pharmaceutical Co., Ltd.,) (50%)+Takelac A65 (trade name, available from the same) (3.13%)+ethyl acetate (46.87%)). Then, the aluminum foil layer and a corona treatment surface of the heat-sealable film were dry-laminated using the above-mentioned urethane-based adhesive to prepare a heat-sealable laminated film.

The heat-sealable laminated films were superposed upon each other in such a manner that the heat-sealable films faced each other, and they were heat-sealed at each temperature using a heat sealer TP-701-B (manufactured by Tester Sangyo Co. Ltd.) under the conditions of a seal gauze pressure of 0.2 MPa, a seal time of 1 second and a seal width of 5 mm. Heating was carried out on the upper side only. Subsequently, the heat-sealed test specimen was cut to a width of 15 mm. The resulting test specimen was peeled using a Tensilon universal tester RTM-100 (manufactured by Orientec Corporation) at a tensile rate of 500 mm/min, and the maximum peel strength (before retorting) was regarded as a heat-seal strength. The measured value is the mean value of 5 times.

Separately, a test specimen having been heat-sealed in the above manner was placed in a high-pressure high-temperature sterilization device of hot water shower type, then treated at 121° C. for 30 minutes and then cooled. Subsequently, the test specimen having been air-dried was cut to a width of 15 mm, and similarly to the above, the resulting test specimen was peeled using a Tensilon universal tester RTM-100 (manufactured by Orientec Corporation) at a tensile rate of 500 mm/min, and the maximum peel strength (after retorting) was regarded as a heat-seal strength. The measured value is the mean value of 5 times.

From the above heat-seal strengths, retention (%) of heat-seal strength after retorting [(heat-seal strength after retorting/heat-seal strength before retorting)×100] was determined.

(6) Thermal Analysis

About 5 mg of a polymer sample was accurately weighed. Using TA Instruments Q100 as a differential scanning calorimeter (DSC), the sample was heated up to 230° C. from −50° C. at a heating rate of 10° C./min to temporarily melt the sample, thereafter maintained at 230° C. for 10 minutes, then cooled down to −50° C. at a cooling rate of 10° C./min to crystallize the sample and heated again up to 230° C. at a heating rate of 10° C./min, under the conditions of a nitrogen gas inlet flow rate of 50 ml/min in accordance with JIS K 7121, to obtain a melting curve. From the resulting melting curve, a glass transition point (Tg) and a melting point (Tm) of the sample were determined.

(7) Intrinsic Viscosity [η] (dl/g)

A polymer sample was dissolved in decalin, and viscosity measurement of the resulting solution was carried out at 135° C. using an Ubbelohde viscometer. From the measured value, an intrinsic viscosity was determined.

(8) Ethylene Content

Ethylene content was determined by $^{13}$C-NMR.

Polymers, etc. used in the examples and the comparative examples are described below.

(a) Propylene polymer composition (A-1)
melt flow rate (230° C.): 3.2 (g/10 min)
Propylene polymer component (a1-1): 86% by mass
Propylene/ethylene random copolymer component (a2-1): 14% by mass, ethylene unit content: 26.6% by mol, intrinsic viscosity [η]: 3.1 dl/g (b) Ethylene/1-butene random copolymer (B-1).
density: 0.885 g/cm$^3$, ethylene unit content: 89% by mol, crystallinity: 13%, melting point: 68° C., Mw/Mn: 2.0, melt flow rate (190° C.): 0.5 g/10 min (c) Soft propylene polymer composition (D-1)
Propylene/ethylene copolymer (d1): 15% by mass [melt flow rate (230° C.): 7.0 g/10 min, Tm: 138° C.]
Propylene/ethylene/1-butene copolymer (d2): 85% by mass [melt flow rate (230° C.): 7.0 g/10 min, Tm: not observed, ethylene content: 13% by mol, 1-butene content: 19% by mol, produced by the use of metallocene catalyst, mm value: 90%]

Example 1

A heat-sealable propylene-based polymer composition (composition-1) obtained by mixing 84.2% by mass of a propylene polymer composition (A-1), 14.8% by mass of an ethylene/1-butene random copolymer (B-1) and 1.0% by mass of a soft propylene polymer composition (D-1) was extruded from a T-die of 240° C. at an extrusion temperature of 250° C. using an unstretched film molding machine equipped with an extruder having a diameter of 40 mm, then rapidly quenched with a casting roll at 25° C. and subjected to corona treatment on one surface to obtain a heat-sealable film having a thickness of 70 μm. The resulting heat-sealable film was evaluated by the aforesaid methods.

The evaluation results are set forth in Table 1.

Example 2

A heat-sealable film having a thickness of 70 μm was obtained in the same manner as in Example 1, except that a heat-sealable propylene-based polymer composition (composition-2) obtained by mixing 82.5% by mass of a propylene polymer composition (A-1), 14.5% by mass of an ethylene/

1-butene random copolymer (B-1) and 3.0% by mass of a soft propylene polymer composition (D-1) was used instead of the composition-1 used in Example 1. The resulting heat-sealable film was evaluated by the aforesaid methods.

The evaluation results are set forth in Table 1.

Example 3

A heat-sealable film having a thickness of 70 μm was obtained in the same manner as in Example 1, except that a heat-sealable propylene-based polymer composition (composition-3) obtained by mixing 80.7% by mass of a propylene polymer composition (A-1), 14.3% by mass of an ethylene/1-butene random copolymer (B-1) and 5.0% by mass of a soft propylene polymer composition (D-1) was used instead of the composition-1 used in Example 1. The resulting heat-sealable film was evaluated by the aforesaid methods.

The evaluation results are set forth in Table 1.

Example 4

A heat-sealable film having a thickness of 70 μm was obtained in the same manner as in Example 1, except that a heat-sealable propylene-based polymer composition (composition-4) obtained by mixing 76.5% by mass of a propylene polymer composition (A-1), 13.5% by mass of an ethylene/1-butene random copolymer (B-1) and 10.0% by mass of a soft propylene polymer composition (D-1) was used instead of the composition-1 used in Example 1. The resulting heat-sealable film was evaluated by the aforesaid methods.

The evaluation results are set forth in Table 1.

Example 5

A heat-sealable film having a thickness of 70 μm was obtained in the same manner as in Example 1, except that a heat-sealable propylene-based polymer composition (composition-5) obtained by mixing 68.0% by mass of a propylene polymer composition (A-1), 12.0% by mass of an ethylene/1-butene random copolymer (B-1) and 20.0% by mass of a soft propylene polymer composition (D-1) was used instead of the composition-1 used in Example 1. The resulting heat-sealable film was evaluated by the aforesaid methods.

The evaluation results are set forth in Table 1.

Example 6

A heat-sealable film having a thickness of 70 μm was obtained in the same manner as in Example 1, except that a heat-sealable propylene-based polymer composition (composition-6) obtained by mixing 59.5% by mass of a propylene polymer composition (A-1), 10.5% by mass of an ethylene/1-butene random copolymer (B-1) and 30.0% by mass of a soft propylene polymer composition (D-1) was used instead of the composition-1 used in Example 1. The resulting heat-sealable film was evaluated by the aforesaid methods.

The evaluation results are set forth in Table 1.

Comparative Example 1

A heat-sealable film having a thickness of 70 μm was obtained in the same manner as in Example 1, except that a heat-sealable propylene-based polymer composition (composition-7) obtained by mixing 85.0% by mass of a propylene polymer composition (A-1) and 15.0% by mass of an ethylene/1-butene random copolymer (B-1) was used instead of the composition-1 used in Example 1. The resulting heat-sealable film was evaluated by the aforesaid methods.

The evaluation results are set forth in Table 1.

TABLE 1

| Items | | | Ex. 1 | Ex. 2 | Ex. 3 | Ex. 4 | Ex. 5 | Ex. 6 | Comp. Ex. 1 |
|---|---|---|---|---|---|---|---|---|---|
| Tensile Modulus | MPa | MD | 519 | 490 | 431 | 351 | 240 | 165 | 501 |
| | | TD | 426 | 412 | 377 | 310 | 220 | 155 | 423 |
| Haze | % | | 63 | 62 | 61 | 59 | 54 | 51 | 65 |
| Low-temperature impact strength | KJ/m | −20° C. | 52.3 | 45.2 | 41.1 | 36.4 | 40.0 | 39.2 | 47.3 |
| | | Number of AA | 4 | 7 | 8 | 8 | 9 | 8 | 4 |
| | | Number of BB | 6 | 3 | 2 | 2 | 1 | 2 | 6 |
| Blocking resistance | N/5.2 cm$^2$ | 60° C. × 7 days | 12.4 | 11.9 | 12.5 | 12.9 | 13.5 | 12.9 | 12.0 |
| Heat-seal strength | N/15 mm | Before retorting 185° C. | 42.6 | 43.3 | 43.3 | 45.0 | 44.7 | 45.2 | 38.0 |
| | | 190° C. | 44.3 | 43.3 | 42.7 | 46.1 | 46.7 | 44.6 | 35.1 |
| | | 195° C. | 44.1 | 45.0 | 44.3 | 46.3 | 45.8 | 44.5 | 38.8 |
| | | After retorting 185° C. | 31.1 | 37.1 | 38.1 | 41.3 | 43.4 | 44.0 | 31.6 |
| | | 190° C. | 38.5 | 41.1 | 42.0 | 43.6 | 46.0 | 44.7 | 32.5 |
| | | 195° C. | 39.0 | 43.2 | 43.2 | 46.2 | 46.9 | 48.2 | 31.3 |
| Retention of HS strength (%) | | 185° C. | 73.0 | 85.7 | 88.0 | 91.8 | 97.1 | 97.3 | 83.2 |
| | | 190° C. | 86.9 | 94.9 | 98.4 | 94.6 | 98.5 | 100.2 | 92.6 |
| | | 195° C. | 88.4 | 96.0 | 97.5 | 99.8 | 102.4 | 108.3 | 80.7 |

As is apparent from Table 1, the heat-sealable films of Examples 1 to 6 retained excellent low-temperature impact strength, had high heat-seal strength and hardly suffered decrease in heat-seal strength even after heat treatment (after retorting). In contrast therewith, Comparative Example 1 to which the soft propylene polymer composition (D-1) had not been added was decreased in heat-seal strength after heat treatment (after retorting).

INDUSTRIAL APPLICABILITY

A heat-sealable film obtained from the heat-sealable propylene-based polymer composition of the present invention has high heat-seal strength, is extremely little decreased in heat-seal strength even after heat treatment, is excellent also in blocking resistance and has high rigidity and low-temperature impact resistance. Therefore, the heat-sealable film of the present invention can be used, of course, as a general-purpose packaging film, and can be favorably used also as a packaging film for articles to be packaged that require heating/sterilization treatment, such as retort pouch foods.

In the heat-sealable laminated film of the present invention, the heat-sealable film having the above properties is formed on the surface as a heat-sealing layer, and therefore, the heat-sealable laminated film is suitable as a packaging material for various articles to be packaged, such as retort pouch foods.

Further, the package of a packaged article requiring heating/sterilization treatment such as retort pouch food according to the present invention retains high heat-seal strength even after heat treatment, has excellent appearance and has the above-mentioned properties. Therefore, this package is hardly peeled or broken at the seal portion even when it is in the course of heating/sterilization treatment or transportation or it is placed under the room-temperature or refrigeration/freezing conditions over a long period of time, so that it can be favorably used.

The invention claimed is:

1. A heat-sealable propylene-based polymer composition comprising: a propylene polymer composition (A) comprising a propylene polymer component (a1) and a propylene/ethylene random copolymer component (a2) having a propylene unit content of 63 to 77% by mol and an ethylene unit content of 23 to 37% by mol, an ethylene/α-olefin random copolymer (B), and a soft propylene polymer composition (D) comprising a propylene polymer (d1) and a propylene/ethylene/α-olefin random copolymer (d2) which has an ethylene content of 2 to 30% by mol and an α-olefin content of 2 to 30% by mol and whose melting point, as measured by a differential scanning calorimeter (DSC), is not observed, wherein:

(1) a mass ratio of the propylene polymer component (a1) to the propylene/ethylene random copolymer component (a2) in the propylene polymer composition (A) is in the range of 60:40 to 97:3, and the propylene/ethylene random copolymer component (a2) has an intrinsic viscosity [η] of 1 to 7 dl/g, (2) the ethylene/α-olefin random copolymer (B) has a density of 0.865 to 0.910 g/cm$^3$, (3) a mass ratio of the propylene polymer (d1) to the propylene/ethylene/α-olefin random copolymer (d2) in the soft propylene polymer composition (D) is in the range of 5:95 to 70:30, and containing the propylene polymer composition (A) in an amount of 50 to 90% by mass, the ethylene/α-olefin random copolymer (B) in an amount of 3 to 25% by mass and the soft propylene polymer composition (D) in an amount of 0.5 to 40% by mass ((A)+(B)+(D)=100% by mass).

2. The heat-sealable propylene-based polymer composition as claimed in claim 1, wherein the ethylene/α-olefin random copolymer (B) is an ethylene/1-butene random copolymer having a melting point (Tm) in the range of 30 to 110° C.

3. A heat-sealable film formed from the heat-sealable propylene-based polymer composition of claim 2.

4. The heat-sealable film as claimed in claim 3, which is a film for packaging an article to be heated/sterilized.

5. A package comprising an article to be heated/sterilized that is packaged by heat-sealing the heat-sealable film of claim 4.

6. A heat-sealable laminated film having a base layer laminated on one surface of the heat-sealable film of claim 3.

7. The heat-sealable laminated film as claimed in claim 6, which is a film for packaging an article to be heated/sterilized.

8. A package comprising an article to be heated/sterilized that is packaged by heat-sealing the heat-sealable laminated film of claim 7.

9. The heat-sealable propylene-based polymer composition as claimed in claim 1, wherein the propylene polymer component (a1) contained in the propylene polymer composition (A) is a propylene homopolymer or a copolymer of propylene and an α-olefin of not more than 10% by mass.

10. The heat-sealable propylene-based polymer composition as claimed in claim 1, wherein the ethylene/cc-olefin random copolymer (B) is a random copolymer of ethylene and an α-olefin of 4 to 10 carbon atoms.

11. The heat-sealable propylene-based polymer composition as claimed in claim 1, wherein the propylene polymer (d1) contained in the soft propylene polymer composition (D) is a homopolypropylene or a propylene/α-olefin copolymer having a melting point of 110 to 165° C.

* * * * *